(12) United States Patent
Laitsaari

(10) Patent No.: US 6,825,758 B1
(45) Date of Patent: Nov. 30, 2004

(54) SYSTEM FOR DETECTING AND COMMUNICATING OPERATIONAL CHARACTERISTICS OF TIRES TELECOMMUNICATIONALLY AND A METHOD THEREFOR

(75) Inventor: Juha M. T. Laitsaari, Tampere (FI)

(73) Assignee: Nokian Tyres PLC, Nokia (FI)

( * ) Notice: Subject to any disclaimer, the term of this patent is extended or adjusted under 35 U.S.C. 154(b) by 675 days.

(21) Appl. No.: 09/603,996

(22) Filed: Jun. 26, 2000

(51) Int. Cl.[7] .............................................. B60C 23/00
(52) U.S. Cl. ...................... 340/442; 340/445; 340/447; 73/146.5; 116/34 R
(58) Field of Search ................................. 340/442, 447, 340/445; 73/146.5, 146.2, 146.4; 116/34 R, 34 A, 34 B; 152/152.1

(56) References Cited

U.S. PATENT DOCUMENTS

| | | | |
|---|---|---|---|
| 4,554,527 A | * 11/1985 | Muller | ........................ 340/443 |
| 4,978,941 A | 12/1990 | Brown | |
| 5,218,861 A | 6/1993 | Brown et al. | |
| 5,297,424 A | 3/1994 | Sackett | |
| 5,473,938 A | 12/1995 | Handfield et al. | |
| 5,483,827 A | 1/1996 | Kulka et al. | |
| 5,540,092 A | 7/1996 | Handfield et al. | |
| 5,585,554 A | 12/1996 | Handfield et al. | |
| 5,731,516 A | 3/1998 | Handfield et al. | |
| 5,731,754 A | 3/1998 | Lee, Jr. et al. | |
| 5,741,966 A | 4/1998 | Handfield et al. | |
| 5,749,984 A | 5/1998 | Frey et al. | |
| 5,825,286 A | 10/1998 | Coulthard | |
| 5,852,283 A | 12/1998 | O'Neill | |
| 5,977,870 A | 11/1999 | Rensel et al. | |
| 6,018,993 A | 2/2000 | Normann et al. | |
| 6,064,299 A | 5/2000 | Leseky et al. | |
| 6,271,748 B1 | * 8/2001 | Derbyshire et al. | .......... 340/442 |
| 6,281,787 B1 | * 8/2001 | Lerg et al. | .................. 340/442 |
| 6,292,095 B1 | * 9/2001 | Fuller et al. | ................. 340/442 |
| 6,292,096 B1 | * 9/2001 | Munch et al. | ............... 340/445 |
| 6,294,989 B1 | 9/2001 | Schofield et al. | |
| 2001/0005165 A1 | 6/2001 | McCarthy et al. | |

* cited by examiner

*Primary Examiner*—Anh V. La
(74) *Attorney, Agent, or Firm*—Louis Woo

(57) ABSTRACT

A system integrated to each of the tires mounted to a vehicle allows each of the tires to communicate with a mobile communicator, such as for example a mobile phone. The system includes at least sensors for monitoring and measuring the pressure and temperature of the tire. The measured parameters of the tire are fed to a processor that compensates the measured pressure with the measured temperature. The temperature corrected tire pressure is then stored in a memory store. A communications module, operating under a wireless data link protocol such as for example the Bluetooth protocol, sends the stored information to a mobile phone, in response to a request thereby. The temperature corrected data of the tire is also transmitted to the other tires of the vehicle. Any one of the tires may act as the server of all of the other tires for transmitting the information of the respective tires of the vehicle to the mobile phone, which acts as the browser. Alternatively, the mobile phone could request that information of the various tires be sent to it individually by the respective tires.

32 Claims, 5 Drawing Sheets

US 6,825,758 B1

SYSTEM FOR DETECTING AND COMMUNICATING OPERATIONAL CHARACTERISTICS OF TIRES TELECOMMUNICATIONALLY AND A METHOD THEREFOR

FIELD OF THE INVENTION

The present invention is directed to tires, and specifically to tires that can transmit information regarding the characteristics thereof to a mobile communications device being carried by a user.

BACKGROUND OF THE INVENTION

A vehicle such as for example an automobile usually has mounted thereto a set of tires. These tires are the only means by which the vehicle makes contact with the road. And when the vehicle is traveling at a high speed, it is imperative that the operational characteristics of the tires be maintained above a given standard so as to avoid accidents and potential injury to the driver and passengers, if any, of the vehicle.

The prior art teaches the incorporation of sensors, either to the tire proper or in proximity thereof, for measuring an operational parameter of the tire. Once the parameter is measured, it is transmitted to a terminal at a remote location, such as for example a maintenance facility, or to a monitor fixedly mounted to the vehicle. Such prior art teachings are disclosed for 20 example in U.S. Pat. Nos. 5,825,286, 5,731,754, 5,731,516, 5,585,554, 5,540,092, 5,741,966, 5,472,938 and 5,825,283.

In particular, the prior art teaches that particular types of interrogators and transmitters have to be designed for a remotely located facility in order for the remote facility to receive information from the tires of the vehicle. And in order to be able to provide information relating to the tires to the driver of the vehicle, a special apparatus has to be either incorporated to the vehicle during its manufacture, or retrofitted thereto after the vehicle has been placed into service. Needless to say, such apparatus specifically designed for receiving the information from the tires are bulky and expensive.

The prior art furthermore does not teach the provisioning of information relating to the tires of a vehicle to the user of the vehicle, when the user is away from the vehicle. Nor does the prior art teach communication among the tires.

It is therefore an objective of the present invention to provide an economical way for a user to mobilely monitor the operational characteristics of the tires mounted to a vehicle.

It is another objective of the present invention to provide a method whereby an operator of a vehicle can query the conditions of the tires on his vehicle, when he is either driving the vehicle or is away from the vehicle.

It is yet another objective of the present invention to enable communication among the tires of the vehicle so that the overall operational characteristics of the tires of the vehicle can readily be conveyed to the operator by means of any one of the tires.

BRIEF DESCRIPTION OF THE FIGURES

The above-mentioned objectives and advantages of the present invention will become apparent and the invention itself will best be understood by reference to the following description of an embodiment of the invention taken in conjunction with the accompanying drawings, wherein.

DETAILED DESCRIPTION OF THE PRESENT INVENTION

Figure 1:
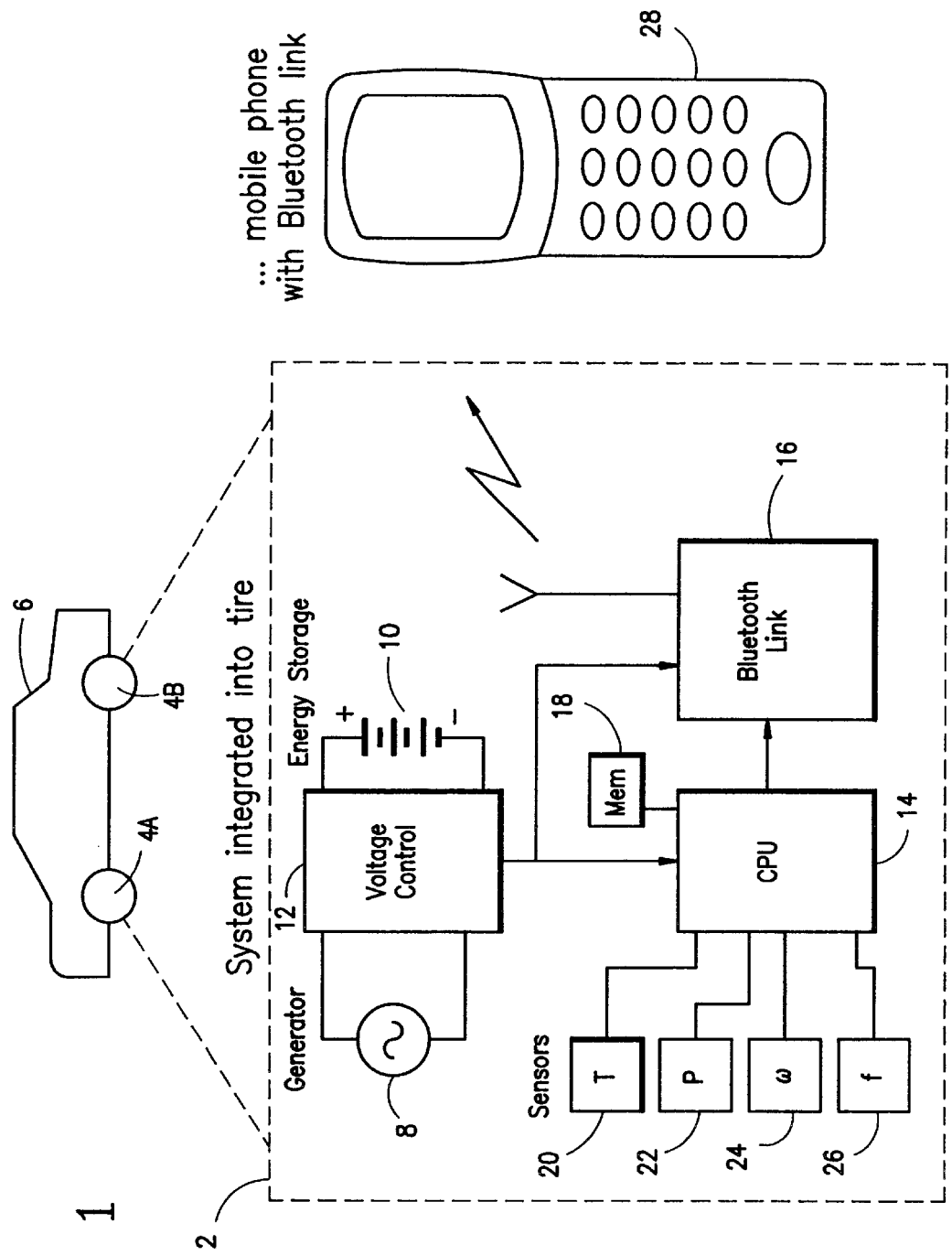
FIG. 1 is an illustration of the system to be integrated to each tire of a vehicle, and its remote connectivity to a mobile communicator.

With reference to FIG. 1, the present invention includes a system 2 that is integrated to each of the plurality of tires 4a, 4b (and those tires not shown), mounted to a vehicle 6. System 2 could be integrated or incorporated to the interior wall of each of the tires 4 of vehicle 6 in a number of ways, among which are the methods in which integrated circuits are affixed to tires as disclosed for example in U.S. Pat. Nos. 5,483,827, 5,977,870 and 5,218,861. The respective disclosures of the '827, '870 and '861 patents are incorporated by reference to the disclosure of the instant specification.

For the instant invention, system 2 that is integrated to each of the tires of the vehicle, such as for example an automobile, a truck, semi, etc., includes a generator 8 that converts the vibrations, or movement, of the tires into electrical energy. Such generator may be a means for converting energy, i.e., an energy conversion mechanism. Generator 8, in practice, could be a linear actuator such as for example the linear actuators manufactured by the Moving Magnet Technologies Company of Besancon, France or a piezoelectric actuator such as the ACX Quick Pack actuator manufactured by the Active Control Experts Company of Cambridge, Mass.

The electrical energy converted from generator 8 is fed to a conventional voltage control circuit 12, so that it may be provided to an energy store such as for example a rechargeable battery 10, a processor 14 and/or a telecommunications or transceiver module 16.

Communications module 16 is a transceiver, or transponder, that operates under a telecommunications protocol. Processor 14 could be any kind of conventional microprocessors made by, for example, companies such as Intel or AMD. For the embodiment shown in FIG. 1, an Atmel Atmeca-103 8 bit micro controller may also be used.

A memory store 18 is electrically connected to processor 14. Data generated by processor 14 may be stored in memory store 18. Conversely, information stored in memory store 18 could be retrieved by processor 14 for further processing.

Also electrically connected to processor 14 are a number of sensors 20, 22, 24 and 26. These sensors are conventional sensors that are used to measure the temperature, pressure, rotational speed and frequency, respectively, of the tire. These sensors could be obtained from the Senso Nor Company of Horten, Norway or the VTI Hamlin Oy of Vantaa, Finland.

Although shown with only four sensors, it should be appreciated that system 2 of the FIG. 1 embodiment could in fact have additional sensors such as for example sensors for measuring the acceleration and other parameters or characteristics of the tire. Other characteristics of the tire that may be measured include for example tire wear or tire friction. Moreover, in addition to the direct monitoring and measurement of the tire pressure, it is also possible to determine the pressure inside the tire from the information obtained from an accerometer. This may be done by correlating a certain pressure level to a certain frequency/ amplitude of movement, or vibration, of the tire.

Accordingly, sensors that measure the acceleration of the tire could also be integrated to the tire. Conversely, for the instant invention to operate, a minimum of at least one sensor, i.e., the pressure sensor, is all that is required.

But for blow-outs or serious cuts, most tire failures are usually preceded by a gradual loss of inflation pressure. Thus, the parameter, or characteristics, of a tire that should be monitored closely is its pressure. But due to the heat generated from the rotational movement and vibration of the tire, to get an accurate reading of the tire pressure, the measured tire pressure should be compensated by the temperature of the tire. Thus, both the air pressure and the temperature of the tire should be monitored by, for example, sensors 22 and 20, respectively, in order to obtain a temperature corrected reading of the tire pressure.

Although the different parameters of the tires are monitored continuously by the respective sensors, to preserve energy, measurements of the parameters are taken periodically. These predetermined periodic measurements are fed to processor 14, which does the actual calculation to compensate the pressure parameter with the temperature parameter, or any other measured parameters.

In those instances where the of interest measured parameter passes a predetermined threshold, for example the measured tire pressure falling below a given pressure such as for example 1.5 bar or 20 psi, a warning signal is immediately output from processor 14 to communications module 16 for transmission to the user. More on that later.

Although unlikely, there is always the possibility that the pressure of the tire would exceed a given high pressure and thereby increases the likelihood that there would be a blow-out. Thus, for the instant invention system, such over inflation likewise would trigger an immediate alarm if the pressure sensor 22 determines that the pressure in the tire approaches or passes an upper predetermined tire pressure limit.

Transceiver module 16 operates under a telecommunications protocol. Such protocol may be a conventional wireless data link protocol such as for example the Bluetooth communications protocol that allows relatively short distance (10M to 100M) data communications between communicative elements with a throughput up to 1 Mbps. The link established by such Bluetooth protocol could be considered as a radio link that operates in the unlicenced 2.4 GHz band. Further, under the Bluetooth protocol, such radio link employs a spread spectrum technique that allows the signal to frequency hop to thereby operate effectively even in noisy environments. Forward error correction (FEC) is also used in the Bluetooth protocol to improve the overall data transfer in the presence of noise. Module 16, operating under such Bluetooth protocol or other similar protocols, may be purchased from the Ericsson Company of Sweden or the Cambridge Silicon Radio Company of Cambridge, England. For the sake of simplicity, the external flash ROM memory that contains the Bluetooth software stack for operating communications module 16 is not shown in system 2.

Given that transceiver module 16 is capable of transceiving information within a given distance, mobile communicators or communication units such as for example pagers, personal digital assistance (PDA) devices, wireless terminals, and mobile phones all may be used for transceiving information with transceiver module 16. For the embodiment shown in FIG. 1, a mobile communicator such as for example a Nokia cellular browser capable phone that is WAP (wireless application protocol) compliant is used. Such mobile phone includes the Nokia models 6210, 6250, 9110i and 7110. Each of those Nokia phones may be used as a WAP browser that enables it to effectively communicate with communications module 16, which may act as a server when communicating with mobile phone 28. As noted above, even though a mobile phone is used for the embodiment of FIG. 1, other types of mobile communicators could likewise be used as the browser, so long as they are WAP adaptive. Of course, as technology advances, other types of wireless data link or speech combined with data link protocols or formats that are equivalents to, or replacements of, the WAP protocol are also envisioned and are adaptable for use for the instant invention.

Insofar as the Bluetooth communications protocol provides for two-way connection, mobile phone 28 in fact is communicatively connectable to any one of the tires 4 mounted to vehicle 6 at any time. Similarly, every tire 10 mounted to vehicle 6 is in direct communication with every other tire so that the respective information from all of the tires of the vehicle are exchanged among the tires. The respective information from the various tires, when fed to a tire, is stored in memory store 18 of that tire. Accordingly, memory store 18 has stored therein information relating to all of the tires of the vehicle. Thus, any one of the tires mounted to the vehicle could in fact act as a server for collecting the operational parameters from the other tires, as well as itself, and transmit all of that information to the mobile communicator. Alternatively, each of the tires can transmit its own information individually to the mobile communicator, as each of the tires has its own communications module.

As phone 28 is mobile, the operator of the vehicle may in fact obtain information relating to the operational characteristics of the tires of the vehicle without being in the vehicle, by simply sending out a query to the tires for retrieving information being monitored thereat.

To conserve energy, when the vehicle is not moving and there is no request from the mobile communicator for information after a given time period, system 2 is put into a sleep or standby mode. But as was noted above, if a certain predetermined threshold is sensed at any of the tires of the vehicle, that tire would wake from its sleep mode and immediately transmit a warning message, which may include sound, vibrations, or other sensory attributes to the operator via mobile phone 28.

Since all of the tires of the vehicle communicate with each other, the respective positions of the tires, with respect to each other and the vehicle, are known. The tires together with the mobile communicator therefore in essence establish a mini telecommunications network or intranet that enables each tire to know exactly the status of the other tires, and to report the respective statuses of the tires to the operator via the mobile communicator carried by him.

With reference to FIG. 2, the operation of the system of the instant invention, as it relates to one of the tires of the vehicle, is given. The operation of the system of the instant invention is effected by the various components, either singly or in combination, as shown in FIG. 1.

Beginning at process step 30, the system is in a sleep mode, or has been put on standby. To initiate the system, a determination is made, by processor 14 from input by an appropriate sensor, on whether vehicle 6 is moving, per process step 32. If the vehicle is stationary, and therefore the tires are not rotating, the process returns to step 30. Once it is determined that the vehicle is moving, the process proceeds to step 34 so that sensors 2026 of the system would begin to measure the various tire parameters of the tire. As was noted above, the two tire parameters that should be measured are the tire pressure and the temperature.

Process step 34 also begins when there is a specific request from the mobile communicator, such as mobile phone 28, that information be transmitted thereto, per step 36. In any event, once the parameters are measured by the sensors, the process proceeds to step 38 in which the measured tire pressure is compensated by the measured temperature. If additional parameters are measured, some of those parameters may also be compensated by the other measured parameters. The process then determines whether the corrected tire pressure is an updated tire pressure, per step 40. If other tire parameters are also being measured and compensated, then those corrected tire parameters are likewise determined per step 40 on whether or not they are updated tire parameters.

If it is determined that the tire pressure has not been updated, the process returns to step 34, so that the tire parameter can continuously be monitored and measured. However, if it is determined that the measured parameter is an updated parameter, then the updated parameter is stored as new data in memory store 18 of the system, per step 42.

Figure 2A:
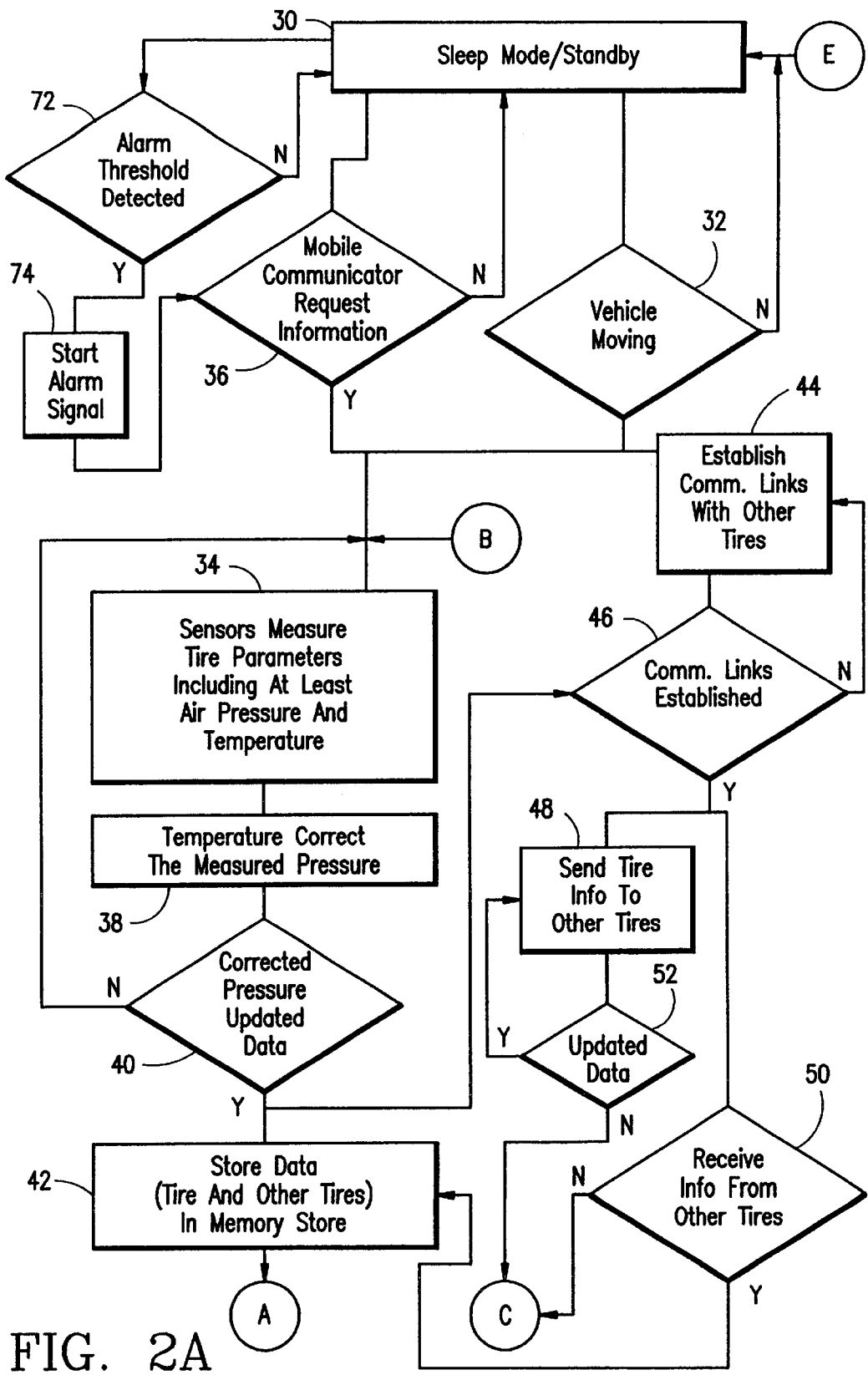
FIGS. 2a–2c in combination form the flow diagram for illustrating the operation of the system of the instant invention as shown in FIG. 1.

Further with respect to FIG. 2*a*, after the process has determined that the vehicle is in fact moving, per step 32, or that the mobile communicator has sent a query requesting information, per step 36, the tire initiates an attempt to establish communications links with the other tires, per step 44. A determination is then made, per step 46, on whether or not the communications links are established. If they are not, the process returns to step 44 and waits until the communications links with the other tires of the vehicle are established.

Figure 2B:
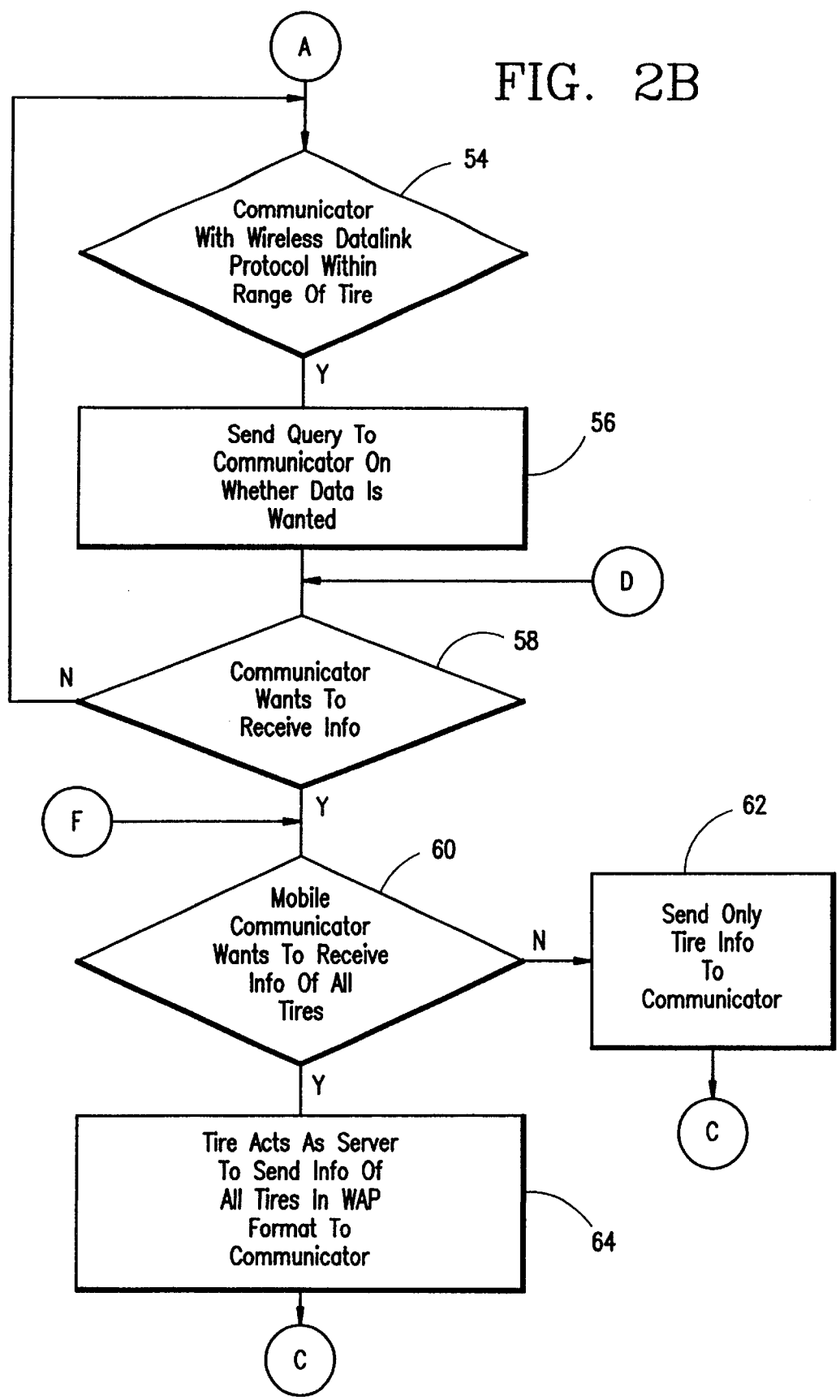
Figure 2C:
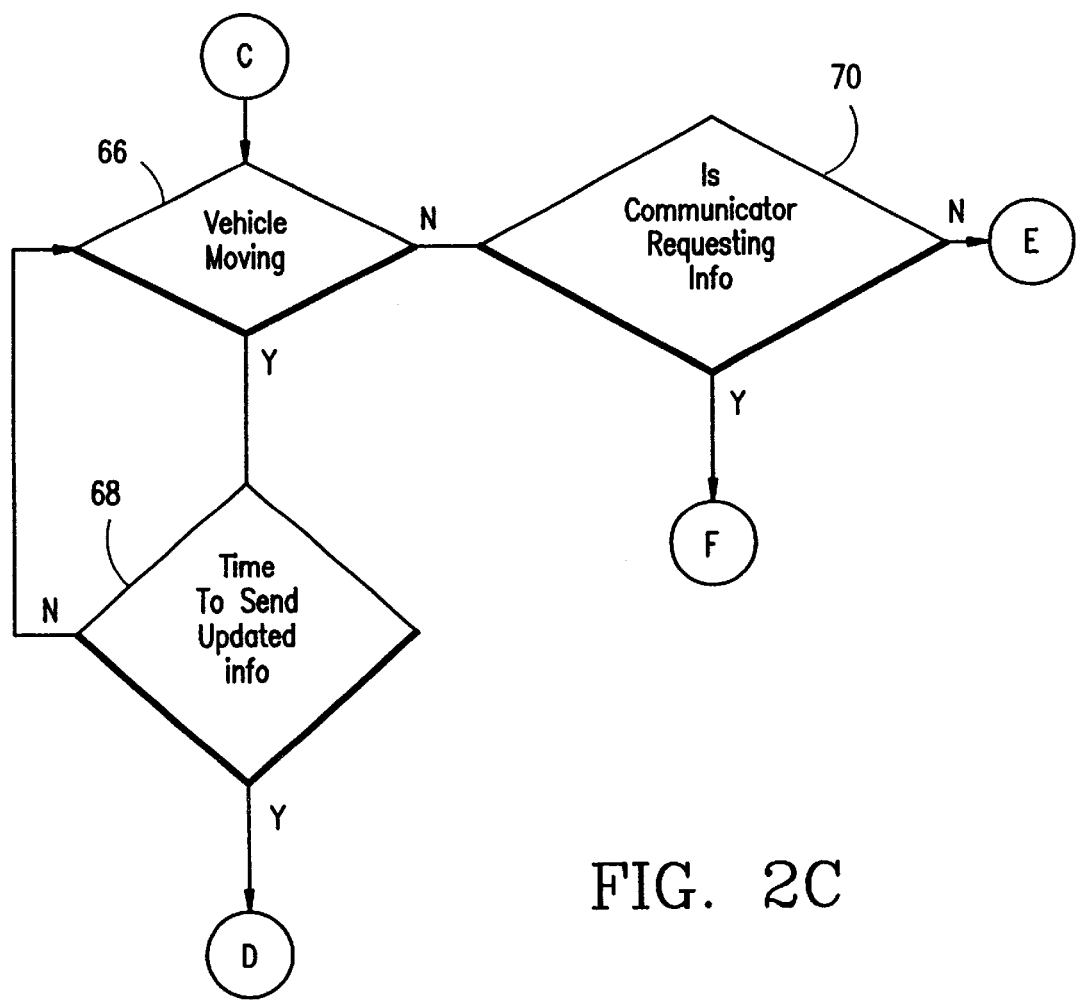

Thereafter, the information, if any, that is stored in the memory store of the system of the tire being discussed with reference to FIG. 2 is transmitted to the other tires of the vehicle, per step 48. At the same time, if there is data that is being transmitted from the other tires of vehicle 6 to the tire being discussed, as determined in step 50, then those data from the other tires are routed to memory store 18 of the being discussed tire for storage. If no data is being received from the other tires, the process proceeds to step 66 (FIG. 2*c*) to determine whether the vehicle is still moving.

Similarly, once the being discussed tire has sent whatever information it has in its memory store to the other tires, it proceeds to step 52 to determine whether the data in its memory store relating to its own characteristics has been updated. If it has, then that updated data is transmitted to the other tires. If not, the process proceeds to step 66.

With reference to FIG. 2*b*, once the measured and compensated parameters relating to the being discussed tire and the data received from the other tires of the vehicle are stored in the former's memory store, the process proceeds to step 54, so that the system can made a determination on whether the mobile communicator is within a certain distance from the tire. As mentioned above, given that the Bluetooth protocol, or other telecommunication protocols similar thereto, allows for communications between various communicative devices from 10 meters to 100 meters, once mobile phone 28 comes within the range of communications module 16, a signal is received thereby that a communicative device such as for example mobile phone 28 is in range.

Once communications module 16 senses that a mobile phone is nearby, it sends out a query to the mobile phone to ask whether the latter wants to receive the data stored in the memory of the system, per step 56. Upon seeing the request displayed on the mobile phone, the user may activate the appropriate button on the phone to provide a response to system 2. If the user does not want any data from the tire, then the process of system 2 returns to step 54 to once again make a determination on whether a mobile communicator is within its range.

However, if a positive response is received from the mobile phone that it indeed wants to receive information from the being discussed tire, then the process next determines, per step 60, on whether the mobile phone wants to receive the information relating to all of the tires of vehicle 6. If it does, per step 64, the tire would act as a server for all of the tires of vehicle 6. The data of the respective tires would then be sent by the being discussed tire, if any of those data is updated data and had not been sent earlier, under a WAP format, to mobile phone 28, per step 64. On the other hand, if the request from the mobile phone is that it does not want to receive the information of all tires from the being discussed tire per step 60, then the being discussed tire would act as a server for itself so that only the tire information relating to it is transmitted to mobile phone 28, per step 62.

The reason that mobile phone 28 would request the information from only the being discussed tire is because mobile phone 28 is provisioned with the capability of either retrieving information individually from all of the tires of the vehicle, or retrieving information from a single tire acting as a server for all of the tires of the vehicle. This alternative adaptability of mobile phone 28 is desirable and could be used, for example, in those instances where there may be a malfunction in the communications system of any one, or more, of the tires of the vehicle. For example, if system 2 of tire 4*b* of vehicle 6 were to malfunction and it has been acting as a server for all of the tires of vehicle 6 in communication with mobile phone 28, then the communications link between tire 4*b* and mobile phone 28 could either be disconnected, or inaccurate data be exchanged between tire 4*b* and mobile phone 28. At which time, recognizing that the received data may not be accurate, the user may switch to the mode whereby mobile phone 28 retrieves data from each of the tires of vehicle 6 individually. And with the separate retrieval of information, the user could easily determine, from the retrieved data from the respective tires, that there is a malfunction at tire 4*b*.

After information is transmitted to mobile phone 28, the process of the instant invention system proceeds to step 66 (FIG. 2*c*) to make a determination on whether the vehicle is still running. If it is, a further determination is made, per step 68, on whether it is time to send updated information to mobile phone 28. If it is, the process proceeds to step 58 to again inquire mobile phone 28 as to whether it wants to receive the updated information from the being discussed tire.

If it is determined in step 66 that the vehicle is no longer moving, the process proceeds to step 70 to make a determination on whether mobile phone 28 is requesting information from the tire. If it is, the process returns to step 60 to query the mobile phone on whether it wants the information from all of the tires or whether it only wants the information from the being discussed tire. If mobile phone is not requesting information as determined in step 70, the process returns to step 30, as the system goes into the sleep mode.

Thus, the respective communication systems of the instant invention for each of the tires in combination effect a telecommunications network in which the system integrated to each tire monitors and measures, at minimum, at least one parameter, but most likely at least the pressure and temperature of the tire, whenever the tire is rolling. The thus measured tire pressure data is temperature corrected by processor 14 of the system and stored in memory store 18. The tire could then send the data relating to itself to the other tires mounted to the vehicle. Accordingly, each tire of the vehicle in turn has stored in its own memory store 18 the respective temperature corrected pressures of all of the tires of the vehicle.

And whenever a mobile communicator such as for example a mobile phone or a PDA comes within range of any one of the tires or the vehicle, each of the tires would ask the mobile phone whether it wants to receive the pressure information relating to itself, or to the other tires of the vehicle. If the answer is yes, each of the tires of the vehicle will act as a server for sending either the information relating only to itself, or the respective data relating to all of the tires of the vehicle, to the mobile phone in the appropriate wireless data link protocol. Putting it differently, for the telecommunications network of the instant invention, any one of the tires of the vehicle may act as the server, while the mobile communicator acts as the browser.

Finally, to conserve energy, if the car is not running and if the mobile phone is not requesting information from the tires, the respective systems of the tires of the vehicle would go into a sleep mode until either the tires once again begin to roll, or whenever the pressure in any one of the tires of the vehicle drops below an alarm threshold, such as for example 1.5 BAR or exceeds a high alarm threshold, such as for example 45 PSI, a pressure well above the acceptable operating pressure of the tire.

This continuous monitoring of the alarm thresholds is represented by processing step 72. See FIG. 2A. So long as there is no detection of any alarm condition, the process continues to monitor for any alarm thresholds. But as soon as an alarm threshold is detected, the process proceeds to step 74 and an alarm signal is sent to the mobile communicator. Thereafter, the process proceeds to step 36 to determine if the user at that point would want to request that information be provided to the communicator as discussed above. If there is no request received, the process would continue to monitor the alarm thresholds and output the alarm signal to the mobile communicator as long as the alarm condition persists, or at least for a predetermined period of time.

In those instances where the mobile communicator, for example mobile phone 28, as carried by the user, is sufficiently far away from the vehicle that the respective communicative systems of tires 4 could not communicate therewith, another embodiment of the instant invention is envisioned.

Figure 3:
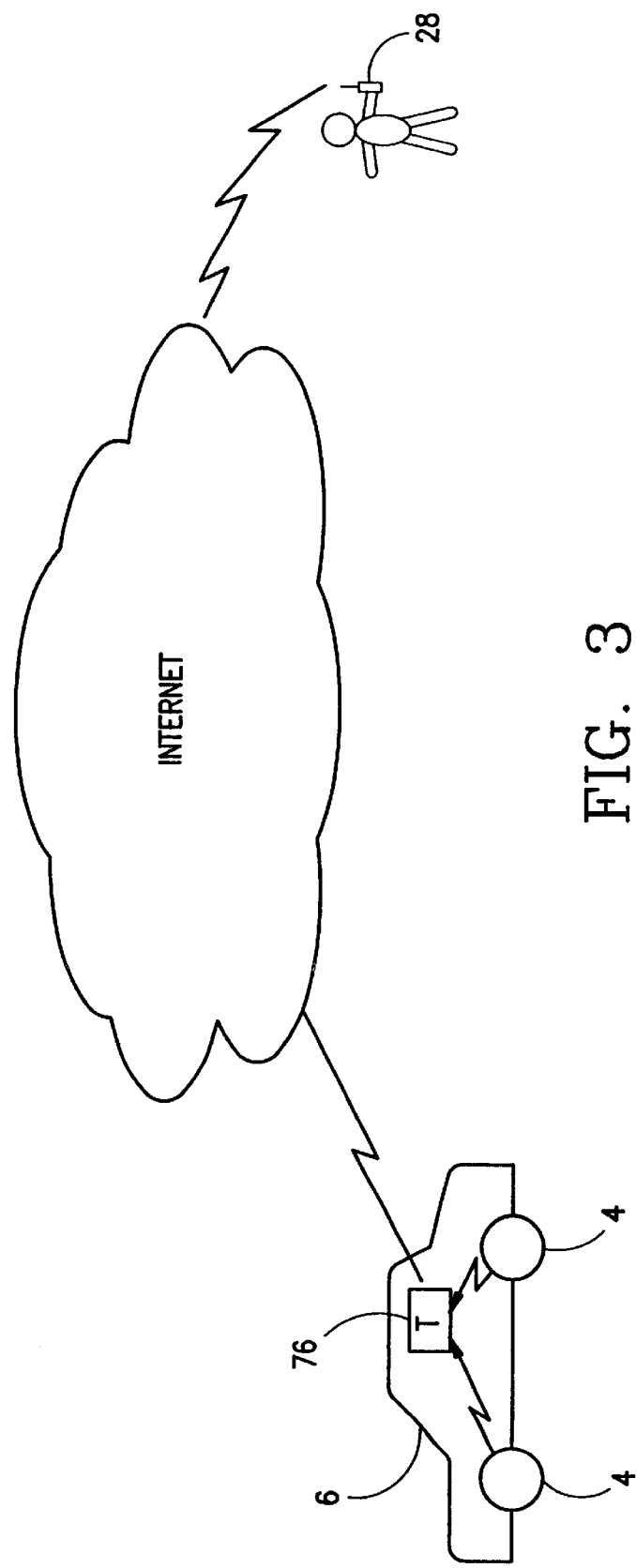
FIG. 3 is an illustration of another embodiment of the instant invention system where information is relayed to the user via his mobile communicator when the user is located out of the ordinary communications range of the tires of the vehicle.

In particular, with reference to FIG. 3 which shows vehicle 6 being sufficiently far away from the user and his mobile communicator 28 so that the respective transceiver systems of tires 4 could not directly communicate therewith, to convey information regarding the operational characteristics of the tires to mobile communicator 28, a computerized communications system 76, mounted to vehicle 6, that has a long range wireless transceiver capable of telecommunicating with mobile communicator 28 via the internet, or other telecommunications or computer networks, is utilized. Using the same datalink protocol as discussed, supra, system 76 is also in direct communication with the transceiver systems of tires 4 of vehicle 6 so that it may transceive data therewith. To communicate with mobile communicator 28 by way of the internet, system 76 is adaptable to use the many available internet protocols and a wireless transceiver, such as for example a wireless modem. The long range signal transmitting aspect of system 76 is conventional and is disclosed, for example, in U.S. Pat. Nos. 5,825,286 and 5,473,938. The respective disclosures of the '286 and '938 patents are incorporated by reference herein.

System 76 could be any communicator or communications system (with sufficient memory store) having transceiving capabilities that enables it to communicate with the transceiver systems of the tires and, at the same time, wirelessly connect to the internet. For example, system 76 may be a conventional laptop computer with wireless telecommunications capability, a web capable PDA or a web capable mobile phone that could be integrated to or retrofitted to vehicle 6. In fact, for those vehicles that have integrated or built in mobile communicators such as mobile phones, system 76 is not necessary as those "fixed" communicators could be configured to communicate with the transceivers of the respective tires, and transmit the operational parameters of the tires to the mobile communicator carried by the user via the internet, when the situation demands or when prompted by the user.

In operation, similar to the operational steps as outlined in FIG. 2, system 76 may periodically send data that it has collected from the various tires of vehicle 6 to mobile phone 28 by means of the internet, or may send information regarding the operational characteristics of the tires to the user when a request is received from mobile phone 28 for the operational characteristics of the tires. So, too, when any one of the tires of vehicle 6 senses that an alarm threshold has been reached or exceeded, an alarm signal is first sent to system 76, which in turn would immediately commence connection with mobile phone 28 via the internet, so as to inform the user of the potential problem by means of an alarm signal, per discussed above.

In essence, instead of sending the data directly from a tire to a mobile phone as was discussed above with respect to FIGS. 1 and 2, the embodiment of FIG. 3 is capable of sending data first from any one of the tires, or all of the tires, to a computer system either mounted to, or resident in, the vehicle to which the tires are mounted. And the computer system mounted to the vehicle is equipped with the appropriate wireless modem or other transceiver means, so as to be able to log onto a telecommunications or computer network, such as for example the internet, and from there convey any information in regard to the tires to the user via the mobile communicator that the user is carrying. In the case where a mobile phone built into the vehicle is used, there is no need for any wireless modem or other transceiver means, as such mobile phones are web based communicators that are adaptable to connect directly to the internet. This alternative embodiment comes into play when the mobile communicator is out of the range of the transceiver systems of the respective tires of the vehicle.

While a preferred embodiment of the present invention is disclosed herein for purposes of explanation, numerous changes, modifications, variations, substitutions and equivalents in whole or in part should now be apparent to those skilled in art to which the invention pertains. Accordingly, it is intended that the present invention be limited only the spirit and scope of the hereto appended claims.

What is claimed is:

1. A system, comprising:

at least one tire movably mounted to a vehicle;

sensor means working cooperatively with said tire for measuring at least one parameter relating to the condition of said tire;

transceiver means electrically connected to said sensor means; and a mobile communicator carried by an operator remotely communicating with said transceiver means for receiving therefrom data relating to parameters measured by said sensor means, wherein when said vehicle is not moving and there is no request from said mobile communicator for data after a given time period, said sensor means and said transceiver means are put into a sleep mode.

2. System of claim 1, wherein said sensor means comprises at least a pressure sensor for measuring the air pressure of said tire and a temperature sensor for measuring the temperature of said tire, said system further comprising:

processor means electrically connected to said sensor means for receiving the parameters measured by said sensor means, said processor means calculating a temperature corrected air pressure for said tire by compensating the measured air pressure with the measured temperature, said processor means further electrically connected to said transceiver means for sending thereto data relating to the temperature corrected air pressure.

3. System of claim 1, wherein said mobile communicator comprises a mobile phone; and wherein said transceiver means is operative under a telecommunications protocol that enables it to communicatively exchange data with said mobile phone within a given distance.

4. System of claim 2, wherein said mobile communicator comprises a mobile phone, said mobile phone adaptable to act as a WAP (Wireless Application Protocol) based browser; and wherein said processor means in combination with said transceiver means are adaptable to act as a WAP server.

5. System of claim 1, wherein said transceiver means comprises a wireless datalink protocol based communications module and wherein said mobile communicator comprises a mobile phone operative under said protocol; and wherein said communications module queries said mobile phone to determine whether said mobile phone wants to receive data relating to the measured parameters of said tire when said mobile phone comes within a given distance from said communications module.

6. System of claim 2, further comprising:

an energy store for supplying electrical energy to at least said transceiver means and said processor means; and an energy conversion means electrically connected to said energy store, said energy conversion means converting the movement of said tire into electrical energy, the converted electrical energy being routed to said energy store for storage.

7. System of claim 6, wherein said energy store comprises a rechargeable battery and wherein said energy conversion means comprises a piezoelectric generator or a linear actuator.

8. System of claim 2, wherein said sensor means further comprises at least one other sensor for measuring the rotational speed and acceleration of said tire.

9. System of claim 5, wherein said tire and said mobile phone communicate periodically, said tire sending updated data relating to the condition of said tire to said mobile phone every predetermined time period, said tire immediately transmitting a warning signal data to said mobile phone if a selected one of the being measured parameters reaches or passes a given thresholds.

10. System of claim 1, wherein said sensor means is integrated to said tire.

11. In combination, a vehicle including a plurality of tires movably mounted thereto, each of said tires having associated therewith a system adaptable to communicate with a mobile communications means, said system comprising:

sensor means for measuring at least one of the parameters that affect the performance of said each tire; and transceiver means electrically connected to said sensor means for outputting and receiving data to and from said system;

wherein each of said systems associated with a corresponding one of said tires mounted to said vehicle is adaptable to communicate with the systems of said other tires movably mounted to said vehicle and further adaptable to act as a server to communicate with said mobile communications means.

12. Combination of claim 11, wherein said system further comprising:

processor means electrically connected to said sensor means and said transceiver means, said processor means using the parameters received from said sensor means to generate data relating to the condition of said each tire, said processor means transmitting a query to said mobile communications means via said transceiver means asking whether said mobile communications means wants to receive the data.

13. Combination of claim 11, wherein the sensor means in each of said tires comprises at least one pressure sensor for measuring the air pressure of said each tire and at least one temperature sensor for measuring the temperature of said each tire, a temperature corrected air pressure of said each tire being obtained by compensating the measured air pressure with the measured temperature.

14. Combination of claim 11, wherein said mobile communications means comprises a WAP (Wireless Application Protocol) based mobile phone; and wherein the tire that acts as the server transmits a query to said mobile phone acting as a browser to ask said mobile phone whether it wants to receive data representative of the respective conditions of said tires when said mobile phone is within a given distance from said vehicle.

15. Combination of claim 11, wherein said mobile communications means comprises a WAP (Wireless Application Protocol) mobile phone; and wherein said tires mounted to said vehicle each exchange data with said mobile phone so that data representative of the condition of each of said tires is separately transmitted to said mobile phone.

16. Combination of claim 11, wherein said tires of said vehicle each exchange data relating to its condition with the other tires; and wherein the system of each of said tires of said vehicle further comprises at least one memory for storing the exchanged data from the other tires as well as the data relating to its own condition so that when said each tire acts as the server, the data relating to the respective conditions of all of the tires of said vehicle is transmitted by said each tire to said mobile communications means.

17. Combination of claim 11, wherein said system goes into a sleep mode if said vehicle is not in operation and said mobile communications means is not requesting data from said tires.

18. Combination of claim 11, wherein said mobile communications means comprises a mobile phone and said transceiver means comprises a communications module; and wherein the respective systems of said tires and said mobile phone all operate under the Bluetooth wireless datalink protocol.

19. Combination of claim 12, further comprising:

an energy store for supplying electrical energy to said transceiver means and said processor means; and an energy conversion means electrically connected to said energy store, said energy conversion means converting the movement of said tire into electrical energy, the converted electrical energy being routed to said energy store for storage.

20. Combination of claim 14, wherein said server tire and said mobile phone communicate periodically with each other, said server tire sending updated data relating to the respective conditions of said tires to said mobile phone every predetermined time period, said server tire immediately transmitting a warning signal to said mobile phone if a selected one of the being measured parameters of said tires reaches or passes a given threshold; and wherein said server tire and said mobile phone continue to communicate with each other and updated data continues to be transmitted to said mobile phone from said server tire until said vehicle is not moving and said mobile phone is no longer requesting that updated data be transmitted thereto.

21. Combination of claim 11, wherein each of said systems is integrated to a corresponding one of said tires.

22. A method of conveying the respective conditions of tires movably mounted to a vehicle to an operator, comprising the steps of:
providing to each of said tires electrically interconnected sensor means, transceiver means and processor means, the sensor means in each of said tires measuring at least one parameter of said each tire that reflects the condition of said each tire;
providing to said operator a mobile communicator adaptable to be in communication with each of said tires;
operating said tires and said communicator under a wireless datalink protocol so that said communicator can establish a data link with any one of said tires for receiving therefrom data indicative of at least the condition of said any one tire; and
putting into a sleep mode at least said sensor means and said transceiver means when said vehicle is not moving and there is no request from said mobile communicator for data after a given time period.

23. Method of claim 22, further comprising the steps of:
configuring said tires to be able to wirelessly communicate among each other; and
operating said tires and said communicator under said wireless datalink protocol so that said communicator can establish a data link with any one of said tires for receiving therefrom data indicative of the respective conditions of said tires.

24. Method of claim 23, further comprising the step of:
said any one tire transmitting a query to said communicator via its corresponding transceiver means asking whether said communicator wants to receive the data generated by its processor means.

25. Method of claim 23, wherein said communicator comprises a mobile phone and wherein the respective transceiver means of said tires each comprise a communications module, said method further comprising the steps of:
exchanging data of said tires among said tires;
designating a selected one of said tires to act as a server and said mobile phone to act as a browser; and
sending data measured by the sensor means of said respective tires relating to the conditions of said respective tires from said server tire via its communications module to said mobile phone.

26. Method of claim 22, wherein said communicator comprises a mobile phone, and wherein said method further comprises the step of:
effecting said tires mounted to said vehicle to individually communicate with said mobile phone so that each of said tires independently exchanges data with said mobile phone and to separately transmit to said mobile phone data representative of the condition of said each tire.

27. Method of claim 22, wherein the sensor means in each of said tires comprises at least one pressure sensor for measuring the air pressure of said each tire and at least one temperature sensor for measuring the temperature of said each tire, wherein said method further comprises the step of:
calculating a temperature corrected air pressure of said each tire by compensating the measured air pressure with the measured temperature.

28. Method of claim 22, wherein said tires of said vehicle each exchange data relating to its condition with the other tires, further comprising the steps of:
providing to each of said tires of said vehicle at least one memory for storing the data received from the other tires relating to the respective conditions of those tires as well as data relating to its own condition; and
transmitting the data relating to the respective conditions of all of the tires of said vehicle to said communicator from any one of said tires when said any one tire is selected to exchange information with said communicator.

29. Method of claim 22, further comprising the steps of:
stopping transmission of data from said tires to said communicator when said vehicle is not moving and said communicator is not requesting data from said tires; and
resuming transmission of data to said communicator when said tires begin to move, when a status request is received from said communicator or when the air pressure in any one of said tires is sensed to be below a predetermined pressure.

30. Method of claim 22, further comprising the steps of:
providing an energy conversion means to each of said tires of said vehicle for converting the movement of said each tire into electrical energy;
providing to each of said tires an energy store for supplying electrical energy to the transceiver means and processor means in said each tire;
electrically connecting an energy conversion means to said energy store; and
routing the converted electrical energy to said energy store for storage.

31. Method of claim 22, wherein said communicator comprises a mobile phone, said method further comprising the steps of:
designating one of said tires as a server tire;
effecting periodic communication between said server tire and said mobile phone, said server tire sending updated data relating to the respective conditions of said tires to said mobile phone every predetermined time period; and
immediately transmitting a warning signal from said server tire to said mobile phone if a selected one of the being measured parameters of said tires passes a given threshold.

32. A method of conveying respective conditions of tires movably mounted to a vehicle to an operator, comprising the steps of:
providing to each of said tires electrically interconnected sensor means, transceiver means and processor means, the sensor means in each of said tires measuring at least one parameter of said each tire that reflects the condition of said each tire;
providing said operator with a mobile communicator adaptable to be in communication with each of said tires and a telecommunications network;
providing an other communicator in said vehicle, said other communicator adaptable to be in communication with each of said tires and said telecommunications network;
operating said tires, said mobile communicator and said other communicator under a wireless datalink protocol so that said mobile communicator and said other communicator each can establish a data link with any one of said tires for receiving therefrom data indicative of at least the condition of said any one tire;

establishing one communications path between said other communicator and said telecommunications network and an other communications path between said mobile communicator and said telecommunication network if said mobile communicator cannot establish a direct datalink with any of said tires; and routing data indicative of the respective conditions using said one and other telecommunications path.

* * * * *